United States Patent
Robinson (10) Patent No.: US 8,131,559 B2
(45) Date of Patent: Mar. 6, 2012

(54) ACCEPTING DOCUMENTS FOR PUBLICATION OR DETERMINING AN INDICATION OF THE QUALITY OF DOCUMENTS

(75) Inventor: Ricky Robinson, Forest Lake (AU)

(73) Assignee: National ICT Australia Limited (AU)

( * ) Notice: Subject to any disclaimer, the term of this patent is extended or adjusted under 35 U.S.C. 154(b) by 551 days.

(21) Appl. No.: 12/513,328

(22) PCT Filed: Nov. 8, 2007

(86) PCT No.: PCT/AU2007/001713
§ 371 (c)(1),
(2), (4) Date: May 1, 2009

(87) PCT Pub. No.: WO2008/058318
PCT Pub. Date: May 22, 2008

(65) Prior Publication Data
US 2010/0057605 A1 Mar. 4, 2010

(30) Foreign Application Priority Data

Nov. 17, 2006 (AU) ................................ 2006906442

(51) Int. Cl.
*G06Q 99/00* (2006.01)
*G06Q 40/00* (2012.01)
(52) U.S. Cl. .............................. 705/1.1; 705/35; 705/37
(58) Field of Classification Search .................. 705/1.1, 705/35, 37
See application file for complete search history.

(56) References Cited

U.S. PATENT DOCUMENTS

| | | | |
|---|---|---|---|
| 5,706,452 A | 1/1998 | Ivanov | |
| 6,175,824 B1* | 1/2001 | Breitzman et al. | 705/36 R |
| 6,665,656 B1* | 12/2003 | Carter | 707/748 |
| 6,832,211 B1* | 12/2004 | Thomas et al. | 705/36 R |
| 6,892,178 B1 | 5/2005 | Zacharia | |
| 6,892,179 B1 | 5/2005 | Zacharia | |
| 6,895,385 B1 | 5/2005 | Zacharia et al. | |
| 7,007,232 B1 | 2/2006 | Ross et al. | |
| 2003/0046307 A1* | 3/2003 | Rivette et al. | 707/104.1 |
| 2005/0071743 A1* | 3/2005 | Harrington et al. | 715/500 |
| 2007/0073748 A1* | 3/2007 | Barney | 707/101 |
| 2007/0118515 A1* | 5/2007 | Dehlinger | 707/3 |
| 2007/0208669 A1* | 9/2007 | Rivette et al. | 705/59 |
| 2009/0112859 A1* | 4/2009 | Dehlinger | 707/6 |

* cited by examiner

Primary Examiner — Sarah Monfeldt (57) ABSTRACT

The invention concerns accepting documents for publication. In particular, but not limited to, the invention concerns the publication of research related papers, such as publishing academic manuscripts on the Internet. The invention also concerns determining an indication of the quality of a document. Using the invention documents are accepted or rejected for publication, and/or an indication of the quality of a document is determined based on market forces associated with the selling of shares in the document. The participants all trade in the virtual market place with the aim of increasing the number of tokens that they own which reflects their reputation as an assessor of documents. This affects the value of shares in documents by increasing the value of documents of a higher quality. Aspects of the invention includes methods, a computer system and software applications used to perform the methods.

31 Claims, 5 Drawing Sheets

ACCEPTING DOCUMENTS FOR PUBLICATION OR DETERMINING AN INDICATION OF THE QUALITY OF DOCUMENTS

TECHNICAL FIELD

The invention concerns accepting documents for publication. In particular, but not limited to, the invention concerns the publication of research related papers, such as publishing academic manuscripts on the Internet. The invention also concerns determining an indication of the quality of a document. Aspects of the invention includes methods, a computer system and software applications used to perform the methods.

BACKGROUND ART

Traditionally, an author that wishes to publish their paper, for example at a conference, must submit the paper for review. Under this system, the reviewers are not provided an incentive to provide fair and thorough reviews. There is often a conflict of interest since reviewers have also submitted papers for consideration. Often it is in the best interests of the reviewer to provide negative review of a paper, in order to maximise the chance that their own paper will be accepted for publication.

Also the traditional method does not attempt to keep reviewers accountable for their reviews. Further, there is little deterrent for preventing authors from submitting papers of poor quality for review.

SUMMARY OF THE INVENTION

The invention concerns the method of accepting documents for publication wherein shares in a first document are traded using tokens in a virtual market place, and participants in the virtual market place each own one or more tokens in the virtual market place, the method comprising:
  receiving from a submitting participant the first document;
  receiving a request from one or more purchasing participants to purchase shares in the first document, subtracting one or more tokens from the ownership of the purchasing participant and adding shares in the first document to the ownership of the purchasing participant;
  if a predetermined amount of shares in the first document are purchased in a predetermined period, accepting the first document for publication; and
  if the document is accepted for publication, adding tokens to the ownership of participants that own shares in a second document cited in the first document accepted for publication.

By using the method of the invention documents are accepted or rejected for publication based on market forces associated with the selling of shares where participants all trade in the virtual market place to increase the number of tokens that they own. Thus by trading in the market place participants seek to increase the number of tokens owned in order to increase their reputation. The invention results in a fairer selection of documents for publication, an increased quality of documents submitted for publication and a method of keeping participants accountable (by referring to their number of tokens owned). The step of receiving the first document also comprises receiving a submission of tokens.

If the first document is accepted for publication, the method further comprises the step of adding tokens to the ownership of the submitting participants.

Tokens added to the ownership of participants that own shares in the second document may be substantially equal to the tokens of the submissions payment.

The first document may be any written document, such as an academic paper, manuscript or website, that cites one or more further documents.

The submitting participant may be an author or benefactor of the document. The purchasing participant may not be an author or benefactor of the first document.

After receiving the document, the method may further comprise the step of adding shares in the first document to the ownership of the submitting participant.

The method may further comprise the step of receiving a substantially positive or substantially negative review of the first document from a reviewing participant. If the predetermined number of shares in the first document are purchased in the predetermined period and the review of the reviewing participant is substantially positive, then adding to the ownership of the reviewing participant one or more tokens, or, if the predetermined number of shares in the first document are purchased in the predetermined period and the review of the reviewing participant is substantially negative, then subtracting from the ownership of the reviewing participant one or more tokens. It is an advantage of this embodiment that the number of tokens owned reflects the quality of the reviewing participants assessment of documents.

Further, if the predetermined number of shares in the first document are not purchased in the predetermined period and the review of the reviewing participant is substantially positive, then subtracting from the ownership of the reviewing participant one or more tokens, or, if the predetermined number of shares in the first document are not purchased in the predetermined period and the review of the reviewing participant is substantially negative, then adding to the ownership of the reviewing participant one or more tokens.

If the predetermined number of shares in the document are purchased in the predetermined time period, then the method may further comprise adding to the ownership of the submitting participant a predetermined number of shares in the document.

If the first document is accepted for publication, the method may further comprise publishing the first document. The first document may be traded and published on the Internet.

The request for the purchase of shares in a document may be in the form of an agreement to pay a sale price or a bid in an action for the shares.

The method may further comprise receiving offers for the sale of shares from participants who own shares in the first document and receiving a further request from a further purchasing participant to purchase shares in the first document, and managing the trade of the shares between participants who own shares in the first document and the further purchasing participants using tokens.

The bids for purchase and offers for sale of shares is based on the value of each share in the tokens.

The second document may have been accepted for publication in accordance with the method described above.

The method may further comprise receiving a substantially positive or negative analysis of the first document and making that further analysis available to other participants. While this analysis does not have a direct bearing on the acceptance or rejection of the document, it may indirectly affect the demand for shares in the document, and therefore indirectly affect its chance of acceptance and its trading price if it is accepted.

A third document that cites the document may be accepted for publication in accordance with the method described above, and the method may further comprise the step of adding one or more tokens to the ownership of participants that own shares in the first document.

The reviewer may not be an author or benefactor of the document.

The method may further receive a request to become a participant which includes receiving payment of real money.

In a further aspect the invention concerns software to perform the method described above.

In yet a further aspect the invention comprises a computer having machine programmable memory which stores the software to cause the computer to operate according to the method described above.

The computer may be a server that is connected to the Internet. The software may include a website.

In yet another aspect the invention provides a method for determining an indication of the quality of documents, wherein shares in a first document are traded using tokens in a virtual market place, and participants in the virtual market place each own one or more tokens in the virtual market place, the method comprising:
  receiving from a submitting participant the first document;
  adding shares in the first document to the ownership of the submitting participant;
  trading shares in the first document using tokens in the virtual market place by receiving a request from one or more purchasing participants to purchase shares in the first document, subtracting one or more tokens from the ownership of the purchasing participant and adding shares in the first document to the ownership of the purchasing participant, wherein the token value of the shares indicates the quality of the first document; and
  adding tokens to the ownership of participants that own shares in a second document cited in the first document.

By using the method of the invention an indication of the value of documents is determined based on market forces associated with the selling of shares in the document where participants all trade in the virtual market place to increase the number of tokens that they own. Since the first document will result in dividends being paid to share holders of the second document this gives participants an incentive to support documents that may compete with their own work and produce a fairer indication of the quality of the first document. Further, the number of tokens owned by a purchasing participant is proportional to their reputation as a good assessor of the quality of documents.

The step of receiving the first document may also comprise receiving a submission payment of tokens. The tokens added to the ownership of participants that own shares in the second document may be substantially equal to the tokens of the submissions payment.

The method may further comprise the step of adding tokens used to purchase shares to the ownership of the submitting participant.

The first document may be an electronic written document that cites one or more further documents.

The submitting participant may be an author or benefactor of the first document. The first document may be traded using a website available on the Internet.

The request from one or more purchasing participants to purchase shares may be to purchase the shares owned by the submitting participant.

Trading shares in the first document may further comprise receiving offers for the sale of shares from participants who own shares in the first document and receiving a further request from a further purchasing participant to purchase shares in the first document, and managing the trade of the shares between participants who own shares in the first document and the further purchasing participants using tokens.

An indication of the quality of the second document may be determined in accordance with the method described above.

A third document may cite the first document and an indication of the value of the third document may be determined in accordance with the method described above, and the method further may comprise the step of adding one or more tokens to the ownership of participants that own shares in the first document.

The invention may further provide software, that when installed on a computer system, may be able to operate the computer system to perform the method described above.

Even further, the invention may provide a computer having machine programmable memory which stores software to cause the computer to operate according to the method described above. The computer may be a server that is connected to the Internet and hosts a website that can be accessed by participants in order to perform the method described above.

BRIEF DESCRIPTION OF THE DRAWINGS

An example of the invention will now be described with reference to the accompanying drawings in which.

BEST MODES OF THE INVENTION

The invention can be used to establish an indication of the quality of documents. The indication of the quality will reflect the quality of the ideas expressed in the document. As set out in this embodiment, named here "Publish Research", the indication of the quality can be used as a basis for determining whether a document should be accepted for publication.

Publish Research is a web-based system for reviewing and determining an indication of the quality of research papers, and for rating participants (authors and reviewers) in terms of their reputation. The reputation of participants is tied to the success of the papers they write and the papers (written by other participants) which they consider to be a high quality and therefore buy shares in those papers.

Publish Research is based upon a virtual free trade environment, whereby each manuscript is akin to a company on the stock market. Participants hold shares in a manuscript underlying a company. The values of shares in a manuscript are set by the market. The holders of shares in a manuscript are paid a dividend (i.e. they are paid a share of the manuscript's earnings). A manuscript earns "money" by being cited in other papers. The more a document is cited by other papers, the higher the quality of that paper and the money "earned" by being cited will increase the value of the shares. The increased value of the shares indicates that the paper is of a high quality. If the paper is never cited then the value of the share will reduce. The reduced value of the shares indicates that the paper is of a low quality. The virtual currency of the market is tokens, such as a 'rep' which stands for Reputation Dollar.

Incorporating a manuscript (the point at which a manuscript becomes its own entity such as a company) and listing it on the market costs a number of reps. It is therefore in the author's best interests to submit only papers that are of a standard likely to attract interest from the research community. The cost of listing a paper on the market is incurred by the paper's authors and any benefactors who are willing to pay part of the cost of submitting the paper. This sum is paid to the Market Operator entity (i.e. Publish Research). Each citation (i.e. bibliographic reference) made by the paper attracts a share of the incorporation cost, and this share of the incorporation cost is paid as a dividend to each shareholder of cited papers if the manuscript is accepted for publication with the system.

Figure 1:
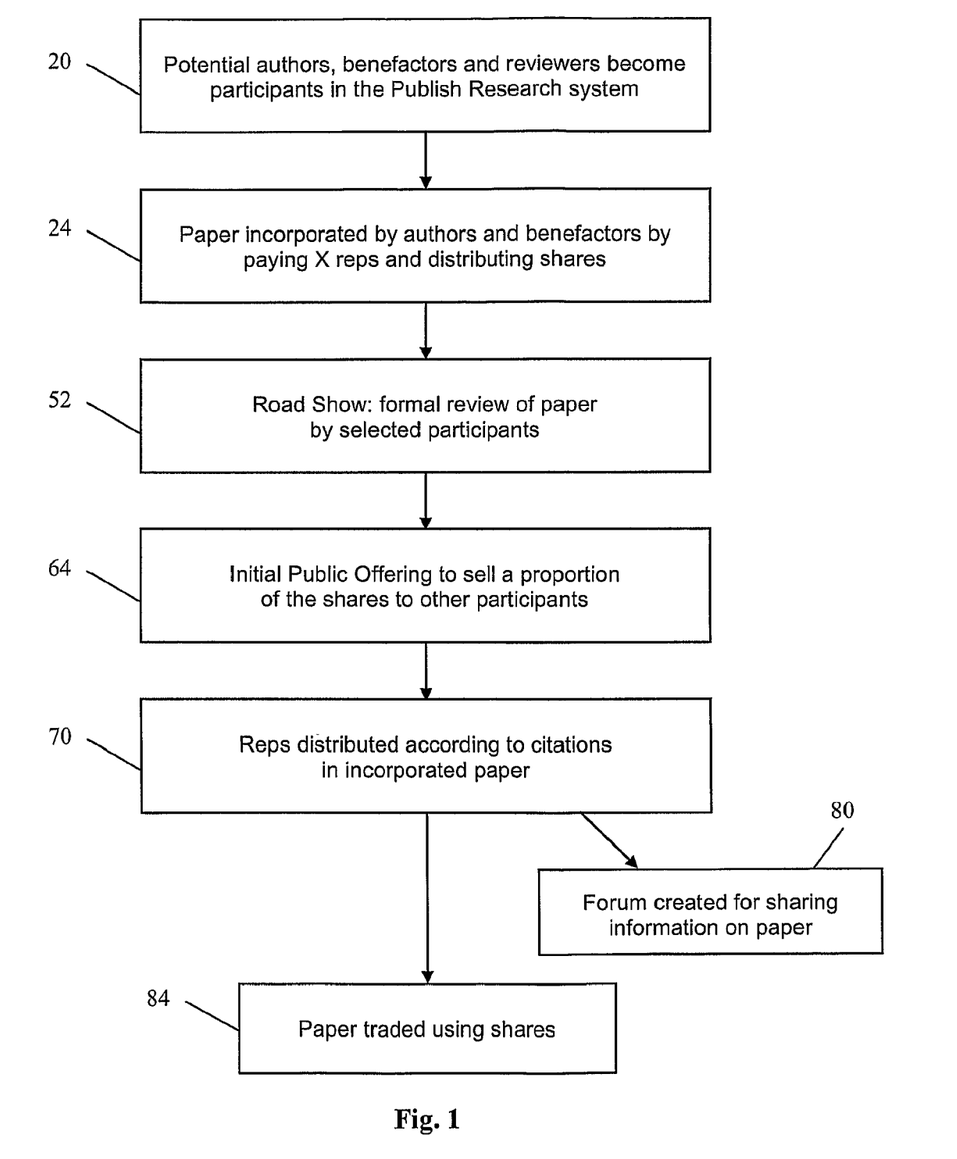
FIG. 1 is a flowchart showing the overall method used with this example of the invention.

The methods of using Publish Research will now be described in more detail with reference to the flowchart of FIG. 1 and the schematic diagrams of FIGS. 2 to 8.

Figure 2:
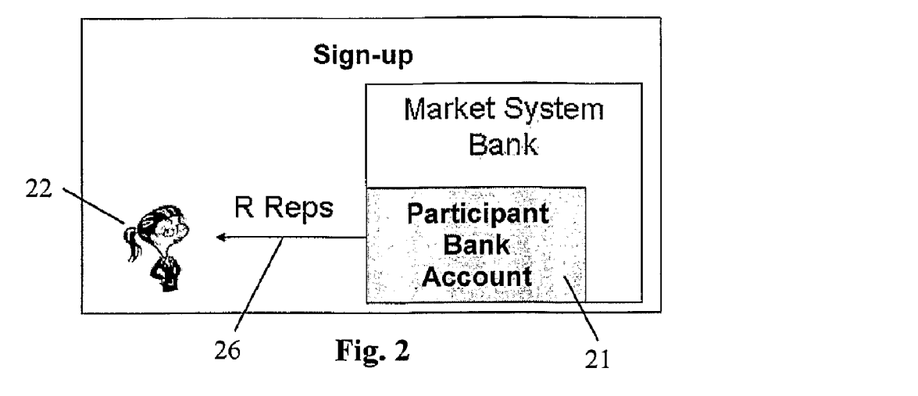
FIG. 2 is a schematic diagram of a person becoming a participant of the system.

Firstly, a person becomes a new participant in the Publish Research system 20. All users of the system, including authors, reviewers and those who wish to purchase shares in documents (herein together referred to as participants) 22 must create a participant Publish Research account 21 in order to participate in the system. Each participant 22 is assigned a unique identity which will distinguish a participant from all others in all market processes. Upon account creation, the participant 22 is given a line of credit to a maximum of R Reputation Dollars (reps) 26 that are the currency used in the Publish Research system. Participants 22 spend reps in order to incorporate a paper for consideration for publication and when they purchase shares in a paper. Participants receive reps when they sell shares in a paper. Incorporation and purchasing shares will be discussed in further detail below. When becoming a participant the person can nominate their technical areas of expertise and this is also recorded.

Figure 3:
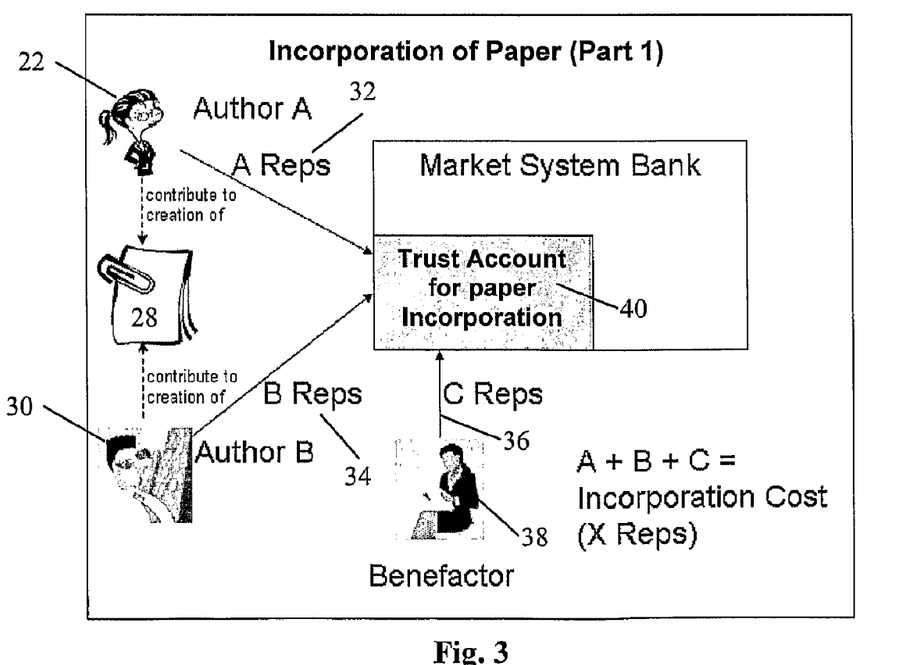
FIG. 3 is a schematic diagram of the first part of incorporating a paper within the system.

Next, a paper or manuscript subject to quality assessment or selection for publication must be incorporated before it can be listed on the market. This corporation is the vehicle in which the paper will reside in the future. The intent to list a paper 28 on the market is signalled via incorporation. Referring first to FIG. 3, the act of incorporation costs money in the form of reps 32, 34 and 36. The source of the funds required for incorporation may come from two sources: the author(s) 22 and 30 and any benefactors 38 who wish to back the publication of the paper (for example, if the authors 22 and 30 between them do not have sufficient reps to incorporate the paper 28). The cost of incorporation is set at X reps. At this time a trust account 40 for the paper is opened. Reps 32 and 34 from the authors 22 and 30 and reps 36 from the benefactors 38 totaling X reps are deposited into the trust account 40 for the paper 28.

Figure 4:
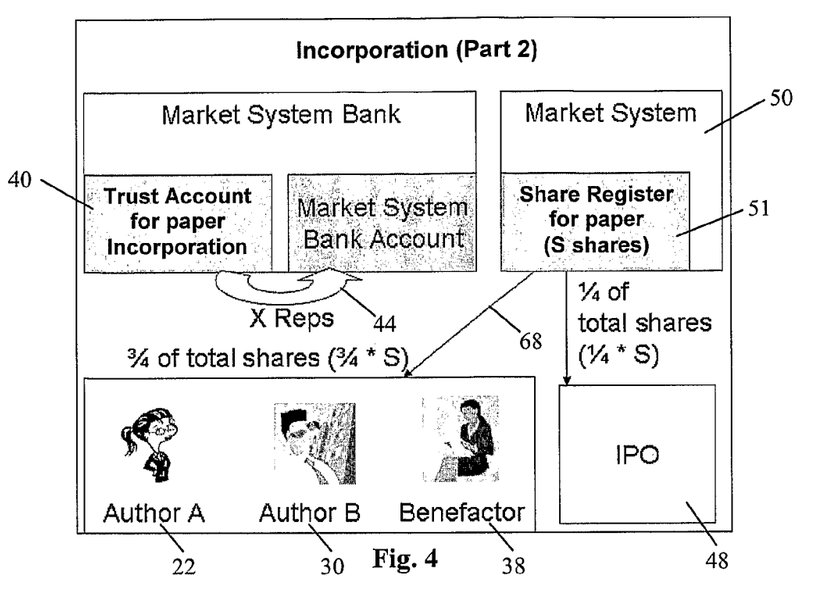
FIG. 4 is a schematic diagram of the second part of incorporating a paper within the system.

Referring now to FIG. 4, the X reps in the trust account 40 for the paper 28 are then transferred 44 to the Publish Research system. Next, shares are allocated from a share register 51 for the paper 28 held within the market system. A portion, such as three quarters, of the shares are distributed to the authors 22, 30 and benefactors 38 in the proportions agreed by the benefactors 38 and authors 22, 30. The remaining portion of the shares, such as one quarter, are retained for the Initial Public Offering 48 (see below).

Figure 5:
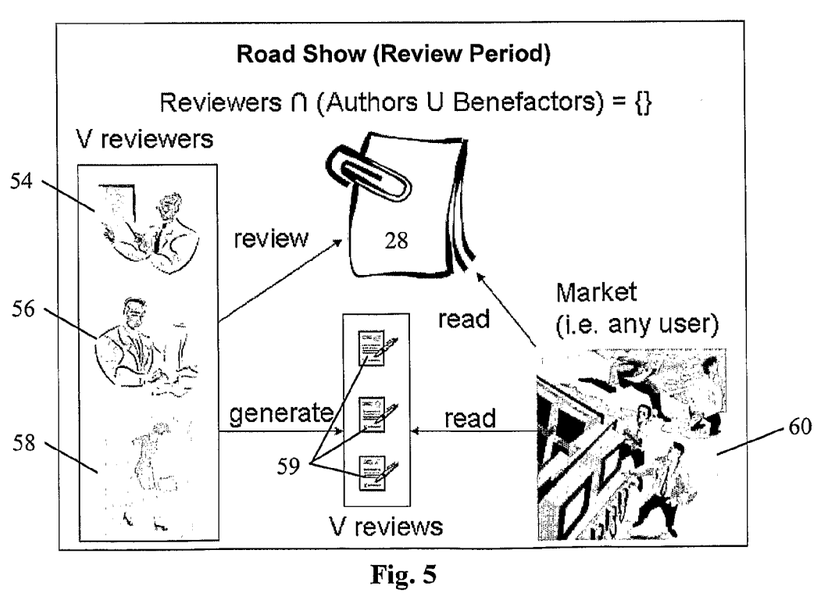
FIG. 5 is a schematic diagram of the reviewing period of the paper incorporated within the system.

In this embodiment, the reps 32, 34 and 36 raised for incorporation are used to pay selected participants to review 59 the paper 28 during the a review phase 52, herein referred to as the Road Show. To allow the public to decide whether the paper 28 makes a significant contribution to the relevant field, and therefore whether shares in the paper 28 may be valuable, the paper undergoes a Road Show period. During this period, a number of reviewers, in this example three reviewers 54, 56 and 58 are selected from the set of non-author, non-benefactor participants by matching their stated expertise to the subject matter of the paper 28.

Alternatively, the Road Show 52 step may not be performed leaving the reps 32 and 34 in the trust account 40 for the paper 28 and the following Initial Public offering step 64 is performed.

Figure 6:
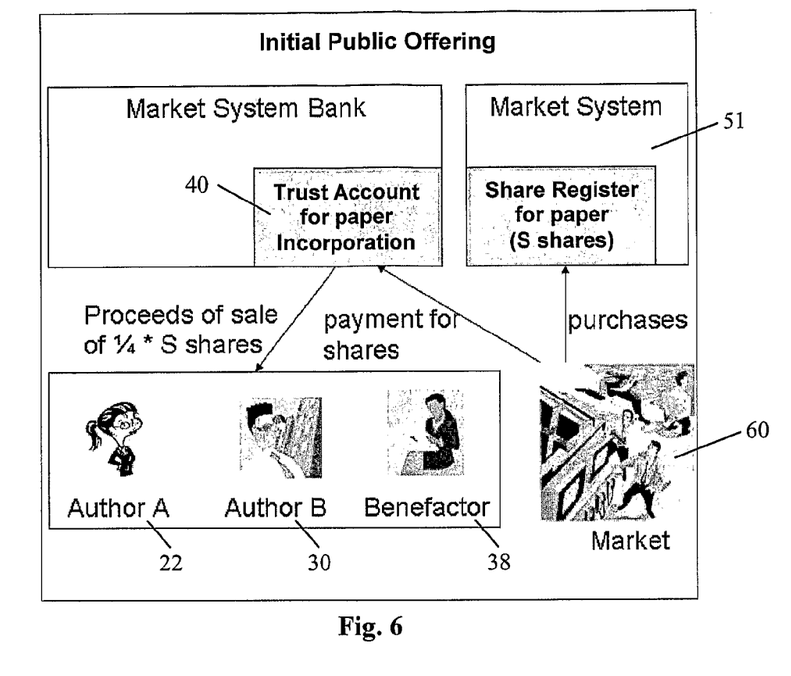
FIG. 6 is a schematic diagram of the Initial Public Offering period of the paper incorporated within the system.

At the conclusion of the Road Show period 52, an Initial Public Offering is held 64. In the real world, companies intending to list on a stock exchange must ensure a certain percentage of its shares are owned by the public (i.e. non-board members, non-employees etc). A similar rule holds for papers 28 intending to be listed on the market 50 (i.e. published). A percentage of shares in each paper 28 held in the share register 51 must be held by non-authors and non-benefactors of the paper 28. The appropriate percentage of shares is sold to the public in the Initial Public Offering.

During this period, members of the research community (i.e., Publish Research participants) can read the manuscript to assess its quality and contribution. If a participant deems the manuscript is a high quality in that it contains a significant contribution, they may elect to participate in the Initial Public Offering in an attempt to acquire shares in the paper.

Referring to FIG. 6, a quarter of the shares not distributed to the authors 22, 30 and benefactors 38 during incorporation are sold to the other participants 60 of the system. The price of the shares can be set via a Dutch auction or by agreement among the authors 22, 30 and benefactors 38. The only restriction is that the price must be greater than or equal to 1 rep and must be bought within a time period set by the market operator. The proceeds of the sale of these shares are held in the trust account 40 for the paper 28 until all publicly offered shares are sold. Once all of the publicly offered shares are sold the paper 28 is considered to be accepted for publication. The funds (reps) are distributed 68 to the holders of the authors 22, 30 and benefactors 28 shares withheld from the Initial Public Offering. After this point, all shares in the incorporated paper 28 as recorded in the share register 51 are tradeable, and are indistinguishable as to whether they were part of the Initial Public Offering or not.

This "reviewing" system marks a clear deviation from the traditional reviewing process, whereby, in theory, papers are reviewed anonymously. Of course, in practice, it is often the case that the authors know who the reviewers are, and can therefore do their best to persuade the reviewers to accept their paper for publication. In this embodiment the reviewers are putting their own reputation on the line by spending some of their reputation (reps) in order to purchase shares in a manuscript. Thus, the reviewer must be sure that the paper is likely to be cited often enough to increase demand in shares for the paper and therefore drive its share price up. Buddy-buddy deals (i.e. cronyism) ought to be kept to a minimum in this manner.

Furthermore, participants 60 may provide feedback to the authors and opinions to other participants via comments. These comments may be structured or freeform. If they are structured, they provide a recommendation as to whether participants should buy shares in the paper. A structured comment has two components: an analysis and a rating. The analysis consists of a brief overview of the participant's understanding of the paper and a summary of the good and bad points in the paper. The rating takes one of the following values:

Strong buy
Buy
Hold
Sell
Strong Sell

These ratings may influence other participants' willingness to purchase shares in a paper. However, the true indication of a paper's quality/value is its current share price. Structured comments and freeform comments are free of charge (i.e., participants do not need to spend any reps to rate a paper) nor do they directly benefit by providing a structured comment. Comments allow participants to make a more informed judgement about a paper. For instance, it may happen that another paper has been previously published that presents the same findings as the paper under consideration. A participant can point this out to the community, which may have an effect on its share price, and more immediately, whether the paper passes the Initial Public Offering phase.

All offered shares must be sold during the Initial Public Offering, otherwise the Initial Public Offering is declared a failure and the paper is not accepted for publication. Anyone who has bought shares loses the reps they spent in acquiring the shares.

Alternatively, the Initial Public Offering 64 may be simplified. Again, a certain percentage of shares may be offered for sale to the public, but there is no time period set by which they all must be sold. In this alternative there is no requirement that all the shares must be sold and publication is not determined by the number of shares sold. Instead the value of the shares themselves within the Publish Research system provides an indication of the quality of the document 28. The proceeds of the sale of these shares are still held in the trust account 40 for the paper. If they are eventually sold, all shares in the paper 28 are tradeable 84 in the virtual free-trade environment of the Publish Research system. The shares are then traded 84 and the current value of the shares at a point in time establishes a current indication of the quality of the document 28 as determined by the participants trading in the market place.

Figure 7:
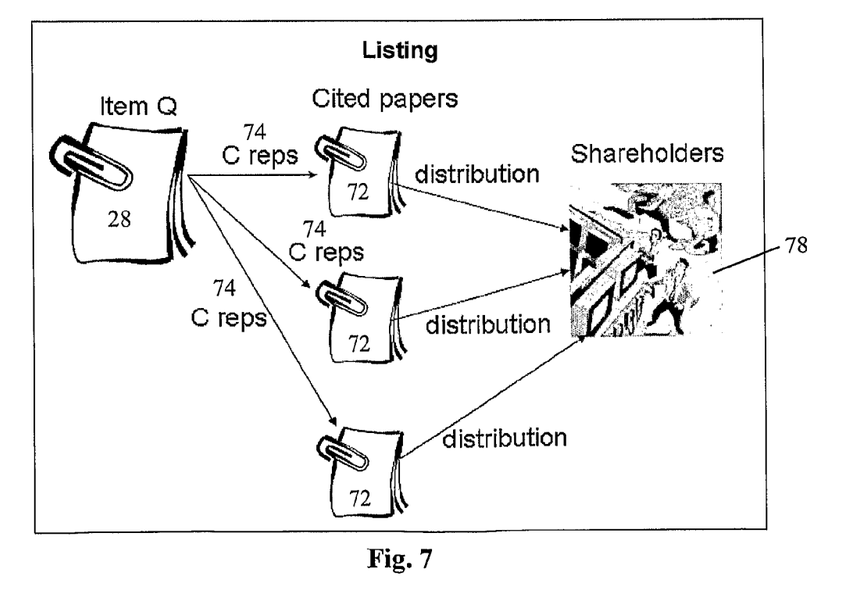
FIG. 7 is a schematic diagram showing how reps are paid and distributed based on citations within the incorporated paper.

Referring back to FIG. 1, after a successful Initial Public Offering, the status of the paper changes from Initial Public Offering to Published/Listed. The paper is now considered published in the Publish Research system. Now, reps are paid 70 to the share holders of other incorporated papers cited in the paper 28. Referring now to FIG. 7, for each reference made by the paper 28 to published papers 72 within the Publish Research system, a payment of C reps 74 is made to the cited paper 72 from the reps owned by authors 22, 30 and benefactors 38. This payment is then delivered to the shareholders 78 of the cited papers 72 as dividends. Thus the value of shares of an incorporated paper 28 will fluctuate (i.e. the indication of the quality of the paper 28 will fluctuate) depending on the expected number of new citations or references that will be made by future papers to this paper 28. As a result, it is in a participant's interest to only buy shares of a paper if they consider that the likelihood that that paper will be frequently cited by other papers is high. For references to papers not in the Publish Research system, the payment is made to the Market Operator.

Referring back to the Road Show 52 as shown in FIG. 5, where reviews 59 were made by selected participants 54, 56 and 58 during the Road Show period 52. The reviews are made available to all participants 60 at the conclusion of the Road Show, so that they may decide whether to participate in the Initial Public Offering 64 for that paper 28. A review consists of a reviewer's declaration of impartiality, a statement of their level of expertise in the given subject matter, an indication of whether or not they would buy shares in the paper, and if so, their determination of a fair price for shares in the Initial Public Offering. The review 59 must also contain an overview of the reviewer's understanding of the paper, including the classification of the paper 28 to one or more subject areas, as well as a brief analysis of the academic merit of the paper 28. The recommendations made by each review 59 are averaged to give an overall recommendation for the paper 28. The selected reviewers 54, 56 and 58 are paid out of the sum 32, 34 and 36 required for incorporation 24. The proportion of the sum given to each reviewer is calculated as follows.

If a reviewer, say 54, recommends that a paper 28 should be listed on the market and the paper is listed on the market (i.e. the Initial Public Offering) and is a success, meaning the a quarter of the shares were sold during the Initial Public Offering, then the reviewer 54 shares the incorporation sum equally with any other reviewers 56 and 58 who also recommended that the paper 28 be listed. If the Initial Public Offering was a failure, thereby preventing the paper 28 from being listed, the reviewer 54 receives nothing.

If the reviewer 54 recommends that a paper 28 should not be listed on the market, and the Initial Public Offering fails or the paper 28 is withdrawn, then the reviewer 54 shares the incorporation sum 32, 34, and 36 equally with any other reviewers 56 and 58 who also recommended that the paper 28 should not be listed. If the Initial Public Offering was a success resulting in the paper 28 being listed, the reviewer 54 receives nothing.

This method gives the reviewer the incentive to make their analysis of the paper correct in the review. It rewards a good quality review and does not reward a bad quality review.

A participant's standing within the system is measured by his or her notional reputation which is the sum of their reps and the current market value of each of the shares they own in various incorporated papers. It is in the interest of the participants to invest their reps wisely and to produce valuable documents for incorporation. In this way the system employs no arbitrary algorithms for calculating reputations. Participants do not rate one another, rather their reputations are determined by market forces, as are the values of the items they create.

Once a paper 28 is listed, it may be reviewed at regular intervals, such as every six months. These reviews are akin to market analyses in stock market systems. A reviewer is selected based on a combination of suitability for the subject matter and time elapsed since the last review. A reviewer making a review is paid by the market operator out of the market operator's working account.

The review has three components: an analysis, a rating and a reviewer's declaration. The analysis consists of an brief overview of the reviewer's understanding of the paper and a summary of the good and bad points in the paper. The rating takes one of the following values:

Strong buy
Buy
Hold
Sell
Strong Sell

The reviewer's declaration states that their review is absolutely impartial and completed to the best of their ability, and indicates their level of expertise in the subject matter dealt with by the paper.

It is possible that more than one reviewer at a time is asked to write a review for a particular paper. In this case, the reviews are averaged and an overall assessment is provided to the public.

Upon incorporation, a forum for the discussion of the newly incorporated paper is created 80. Here anyone may discuss the paper 28 and reviews 59 of the paper. In conjunction with the regular reviews of a paper, the forums are a means of sharing information which may affect the price of shares of that paper 28. For instance, someone might announce the recent publication of another paper which supports/opposes the conclusions of this paper 28, thereby leading to greater/less demand for shares in this paper 28.

Figure 8:
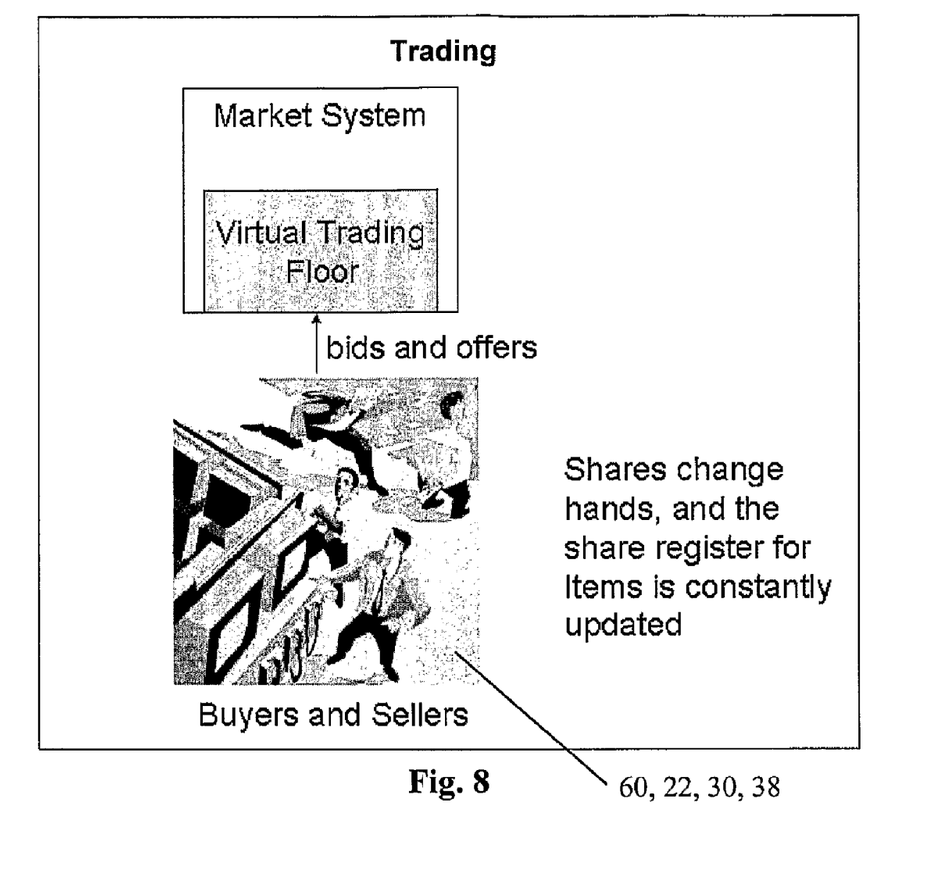
FIG. 8 is a schematic diagram of trading shares of a paper incorporated within the system.

Now that the paper is listed it can be traded in the virtual market place 84. The buying and selling of shares occurs similarly to an electronic stock exchange system like the NASDAQ. This is shown in FIG. 8. Bids are stacked in descending order of bid price, so that the highest bid is on the top of the bid stack. Offers are stacked in ascending order of offer price, so that the lowest offer is at the top of the offer stack. When the top (highest) bid price is greater than or equal to the top (lowest) offer price, a trade occurs. If a bid is submitted that matches the offer on top of the offer stack, the trade executes at the offer price. If an offer is submitted that matches the bid on top of the bid stack, the trade executes at the bid price. This methodology helps to stabilise the price of shares in a paper 28. The volume of the trade is the lesser of the bid and offer sizes. Thus, partial orders can be fulfilled. The remaining part of the order can be fulfilled in subsequent trading.

As with ordinary stock exchanges, for each stock the latest trading price, the lowest offer and the highest bid are reported after each trade.

The system allows for so called insider trading, in which an author, benefactor, colleague or other participants in the know buy or sell shares in a paper based on non-public knowledge. We share the view of renowned economist Milton Friedman and others who insist that insider trading introduces new information into the market in an efficient manner. That is, the volume and price of inside trades contain information that should alert the market to favourable or unfavourable circumstances. For example, if the authors buy more stock in their own papers, it could indicate that the results of an independent trial are about to be published, which validates the results of their own paper. On the other hand, if the authors sell their stock, it could indicate that they've uncovered a flaw in their results which went unnoticed by the rest of the Publish Research participants. In either case, this trading activity by the authors provides information to other participants about events surrounding the paper.

If the authors 22 and 30 wish to withdraw a paper, they may do so at any time before the Initial Public Offering. The cost of incorporation is not refunded.

It is incumbent upon authors to ensure that the any papers they cite are known to the Publish Research system. If a cited paper is not already in the Publish Research system, then it must be added. These added papers are not incorporated. That is, there are no shares owned in these papers, so they do not attract dividends. These additions are known as idle listings. Authors who add these papers to the system receive rep vouchers which may be redeemed for the purposes of incorporating their papers. There are a maximum number of vouchers which may be held by a participant at any given time. These rep vouchers are not included in the calculation of an author's reputation.

If a paper has been added as an idle listing, it may be incorporated at a later date by one or more of its authors by activating the idle listing. Activation incorporates the paper (at a higher cost of incorporation than usual), and distributes the S shares to the authors who activated the idle listing. The shares then attract dividends just as any other Publish Research publication.

Further, Publications such as books and magazine articles may be incorporated retroactively by their authors, without needing to add them as idle listings first. This process is identical to that of the usual method of submitting a manuscript, except that it attracts the higher cost of incorporation mentioned above, there is no Road Show period, the authors initially own all S shares, and all S shares are immediately tradeable.

The text of idle listings and retroactive additions are not available through the Publish Research system (unless there are no copyright issues). However, Publish Research requires an abstract, summary or blurb to be provided, along with the complete list of references made by the publication to other publications. In the case of incorporated retroactive additions, the reference list is used to distribute citation payments as usual.

The embodiment explained here overcomes many of the disadvantages of the traditional publication processes for research.

First, in traditional reviewing processes reviewers are not provided an incentive to provide fair reviews. There is often a conflict of interest since reviewers have also submitted papers for consideration. It is therefore often in the best interests of the reviewer to provide a negative review of a paper, thereby maximising the chance their own paper will be accepted. In Publish Research, it is in the best interest of participants to support high quality papers and ignore papers of low quality.

Second, because it is not "free" for authors to submit papers, it is in their best interests to submit only the highest quality manuscripts. Furthermore, there is the possibility that the Initial Public Offering might fail, in which case the authors cannot reclaim the money spent on incorporation.

Since benefactors may be required to bear some of the cost of floating a paper, and due to the rule that a certain percentage of shares must be held by participants other than the authors, it encourages manuscripts to be well reviewed internally (i.e., by the benefactors who may be non-author colleagues or superiors) and externally before it can be listed on the exchange.

A researcher's reputation as measured by Publish Research gives a more accurate measure of the researcher's standing than citation counts, as his/her reputation will fluctuate with price of shares he/she currently holds (including, importantly, the shares of papers authored by the researcher). Furthermore, the research quality of a paper can be directly assessed by its current share price. Thus, papers do not have to wait to accumulate a large number of citations before they are deemed to be high quality. If it is immediately recognised as being high quality by the research community, its share price will reflect this very quickly.

Since participants start with only a modest reputation they must gain reputation by writing fair and thorough reviews before they have enough reputation to incorporate a paper of their own. Alternatively, they may be bootstrapped by fellow authors or peers who cover the costs of incorporating a paper. This encourages young researchers to form close relationships with their advisors and mentors, and also introduces them to the process of reviewing papers early in their careers. Further, unlike existing review processes, participants are held accountable for their reviews by way of (relative) reputation. Outstanding researchers ought to have few problems in gaining reputation credits, either by writing reviews or authoring papers and having others pay the cost of floating the paper (for benefactors stand to gain by helping researchers with good ideas to publish a paper).

The major revenue stream is the fees paid by new participants. Not only does this provide a revenue stream, it also helps to ensure that phantom users will not be created by abusers of the system who intend to use these fake user accounts to improve their own reputation. The fee for joining will probably be less than researchers and academics pay to have a paper published in a conference proceedings. To support a create revenue stream the participation can be payable annually.

The Publish Research system is made available to the public using a website accessible using any Internet enabled computer. The computer will include display means to view the website, input means to interact with the website and enter information into the website, and communication and processing means in order to access, send and receive information to and from the Publish Research system over the Internet.

The Publish Research website is hosted by one or more interconnected computers or servers and are connected to the Internet to enable access by participants. The server(s) of the Publish Research system will store live data on:

Market System Bank including details of reps owned by each participant, reps owned by the system operators in a Market System Bank account and reps owned by each participant in their individual participant bank accounts.

Market Share System, including a share register for each incorporated paper and the allocation of shares to participants. Further the Market Share System records the status of current offers and bids and the various published statistics.

Each registered participant, including their unique identifier, their details, technical expertise and their participant bank account identifier.

This information is stored in a relation database that can be accessed by a participant using the website. That is, participants become members, incorporate papers, trade and review papers by accessing the website. The servers of the Publish Research system include processing means, storage means and communication means in order to offer the Publish Research website using the stored information according to the method described above.

It will be appreciated by persons skilled in the art that numerous variations and/or modifications may be made to the invention as shown in the specific embodiments without departing from the spirit or scope of the invention as broadly described.

For example, the share proportions, number of authors, benefactors and reviewers, time periods and other similar details provided in this description of an example of the invention can easily be changed without departing from the invention.

Further, where possible, the order of the steps need not be performed as described here. For example, reps may be distributed 70 even if the paper is not incorporated or before a document is published reps could be paid to the shareholders of the cited documents. Real currency could be used in place of virtual currency reps.

The present embodiments are, therefore, to be considered in all respects as illustrative and not restrictive.

The invention claimed is:

1. A method of accepting documents for publication at a server wherein shares in a first document are traded using tokens in a virtual market place, and participants in the virtual market place each own one or more tokens in the virtual market place, the method comprising:
    receiving from a submitting participant the first document;
    receiving a request from one or more purchasing participants to purchase shares in the first document, subtracting, at the server, one or more tokens from an account of the one or more purchasing participants and adding shares in the first document to the account of the one or more purchasing participants;
    accepting the first document for publication after a predetermined amount of shares in the first document are purchased in a predetermined period; and
    adding tokens to an account of at least one participant that owns shares in a second document cited in the first document.

2. The method according to claim 1, wherein the step of receiving the first document also comprises receiving a submission payment of tokens.

3. The method according to claim 1, wherein if the first document is accepted for publication, the method further comprises comprising the step of adding tokens to the ownership of an account of the submitting participant.

4. The method according to claim 2, wherein the tokens added to the account of the at least one participant that owns shares in the second document is substantially equal to the tokens of the submission payment.

5. The method according to claim 1, wherein the first document is an electronic written document that cites one or more further documents.

6. The method according to claim 1, wherein the submitting participant is an author or benefactor of the first document.

7. The method according to claim 6, wherein the one or more purchasing participants is not the author or benefactor of the first document.

8. The method according to claim 1, wherein the method further comprises the step of adding shares in the first document to the account of the submitting participant.

9. The method according to claim 1, wherein the method further comprises the step of receiving a positive or negative review of the first document from a reviewing participant.

10. The method according to claim 9, further comprising:
    adding one or more tokens to an account of the reviewing participant when the predetermined number of shares in the first document are purchased in the predetermined period and the review of the reviewing participant is substantially positive, or,
    subtracting one or more tokens from the account of the reviewing participant when the predetermined number of shares in the first document are purchased in the predetermined period and the review of the reviewing participant is negative.

11. The method according to claim 1, further comprising the step of publishing the first document.

12. The method according to claim 1, wherein the first document is traded and published using a website available on the Internet.

13. The method according to claim 1, wherein the method further comprises receiving offers for the sale of shares from participants who own shares in the first document and receiving a further request from a further purchasing participant to purchase shares in the first document, and managing the trade of the shares between participants who own shares in the first document and the further purchasing participant using tokens.

14. The method according to claim 1, further comprising:
    receiving the second document from a second submitting participant;
    receiving a request from the one or more purchasing participants to purchase shares in the second document, subtracting, at the server, one or more tokens from the account of the one or more purchasing participants and adding shares in the first document to the account of the one or more purchasing participants; and accepting the second document for publication after a predetermined amount of shares in the second document are purchased in a predetermined period.

15. A computer-readable storage media having computer-readable instruction stored thereon, when executed by a computing device, cause the computing device to perform the steps comprising:
receive from a submitting participant the first document;
receive a request from one or more purchasing participants to purchase shares in the first document, subtracting, at the server, one or more tokens from an account of the one or more purchasing participants and adding shares in the first document to the account of the one or more purchasing participants;
accept the first document for publication after a predetermined amount of shares in the first document are purchased in a predetermined period; and
add tokens to an account of at least one participant that owns shares in a second document cited in the first document.

16. A computer system comprising a processor and machine programmable memory which stores software to cause the processor to perform the steps comprising:
receive from a submitting participant the first document;
receive a request from one or more purchasing participants to purchase shares in the first document, subtracting, at the server, one or more tokens from an account of the one or more purchasing participants and adding shares in the first document to the account of the one or more purchasing participants;
accept the first document for publication after a predetermined amount of shares in the first document are purchased in a predetermined period; and
add tokens to an account of at least one participant that owns shares in a second document cited in the first document.

17. The computer system according to claim 16, wherein the processor is a server that is connected to the Internet and hosts a website that can be accessed by participants.

18. A method for determining an indication of the quality of documents at a server, wherein shares in a first document are traded using tokens in a virtual market place, and participants in the virtual market place each own one or more tokens in the virtual market place, the method comprising:
receiving from a submitting participant the first document;
adding, at the server, shares in the first document to an account of the submitting participant;
trading, at the server, shares in the first document using tokens in the virtual market place by receiving a request from one or more purchasing participants to purchase shares in the first document;
subtracting, at the server, one or more tokens from an account of the one or more purchasing participants and adding shares in the first document to the account of the one or more purchasing participants, wherein the token value of the shares indicates the quality of the first document; and
adding tokens to an account of participants that own shares in a second document cited in the first document.

19. The method according to claim 18, the step of receiving the first document also comprises receiving a submission payment of tokens.

20. The method according to claim 18, wherein the method further comprises the step of adding tokens used to purchase shares to the account own the submitting participant.

21. The method according to claim 19, wherein the tokens added to the account of participants that own shares in the second document is substantially equal to the tokens of the submissions payment.

22. The method according to claim 18, wherein the first document is an electronic written document that cites one or more further documents.

23. The method according to claim 18, wherein the submitting participant is an author or benefactor of the first document.

24. The method according to claim 18, wherein the first document is traded using a website available on the Internet.

25. The method according to claim 18, wherein the request from one or more purchasing participants to purchase shares are the shares owned by the submitting participant.

26. The method according to claim 18, wherein trading shares in the first document further comprises receiving offers for the sale of shares from participants who own shares in the first document and receiving a further request from a further purchasing participant to purchase shares in the first document, and managing the trade of the shares between participants who own shares in the first document and the further purchasing participants using tokens.

27. The method according to claim 18, wherein an indication of the quality of the second document is determined according to the following steps:
receiving from a second participant the second document;
adding, at the server, shares in the second document to an account of the second participant;
trading, at the server, shares in the second document using tokens in the virtual market place by receiving a request from one or more purchasing participants to purchase shares in the second document;
subtracting, at the server, one or more tokens from the account of the one or more purchasing participants and adding shares in the first document to the account of the one or more purchasing participants, wherein the token value of the shares indicates the quality of the first document.

28. The method according to claim 18, wherein a third document cites the first document, the method further comprising the step of adding one or more tokens to the account of participants that own shares in the first document.

29. A computer-readable storage media having computer-readable instruction stored thereon, when executed by a computing device, cause the computing device to perform the steps comprising:
receive from a submitting participant the first document;
add, at the server, shares in the first document to an account of the submitting participant;
trade, at the server, shares in the first document using tokens in the virtual market place by receiving a request from one or more purchasing participants to purchase shares in the first document;
subtract, at the server, one or more tokens from an account of the one or more purchasing participants and adding shares in the first document to the account of the one or more purchasing participants, wherein the token value of the shares indicates the quality of the first document; and
add tokens to an account of participants that own shares in a second document cited in the first document.

30. A computer system comprising a processor and machine programmable memory which stores software to cause the processor to perform the steps comprising:
receive from a submitting participant the first document;
add, at the server, shares in the first document to an account of the submitting participant;
trade, at the server, shares in the first document using tokens in the virtual market place by receiving a request from one or more purchasing participants to purchase shares in the first document;

subtract, at the server, one or more tokens from an account of the one or more purchasing participants and adding shares in the first document to the account of the one or more purchasing participants, wherein the token value of the shares indicates the quality of the first document; and add tokens to an account of participants that own shares in a second document cited in the first document.

31. The computer according to claim 30, wherein the computer is a server that is connected to the Internet and hosts a website that can be accessed by participants.

* * * * *